US006411800B1

(12) United States Patent
Emerson, III

(10) Patent No.: US 6,411,800 B1
(45) Date of Patent: Jun. 25, 2002

(54) ENHANCED RADIO DATA SYSTEM

(75) Inventor: Harry E. Emerson, III, Budd Lake, NJ (US)

(73) Assignee: SurferNetwork.Com, Inc, Mount Olive, NJ (US)

(*) Notice: Subject to any disclaimer, the term of this patent is extended or adjusted under 35 U.S.C. 154(b) by 0 days.

(21) Appl. No.: 09/477,964

(22) Filed: Jan. 5, 2000

Related U.S. Application Data

(60) Provisional application No. 60/115,072, filed on Jan. 7, 1999.

(51) Int. Cl.[7] .................... H04B 1/18

(52) U.S. Cl. .................... 455/186.1; 455/45; 455/154.1

(58) Field of Search .................... 455/186.1, 45, 455/158.1, 154.1, 166.2, 161.1

(56) References Cited

U.S. PATENT DOCUMENTS

| | | | | |
|---|---|---|---|---|
| 4,574,378 A | | 3/1986 | Kobayashi | 370/104 |
| 4,864,564 A | | 9/1989 | Parker et al. | 370/94.1 |
| 4,905,234 A | | 2/1990 | Childress et al. | 370/94.1 |
| 5,063,610 A | | 11/1991 | Alwadish | 455/45 |
| 5,134,719 A | * | 7/1992 | Mankovitz | 455/154.1 |
| 5,193,214 A | * | 3/1993 | Mardus et al. | 455/186.1 |
| 5,283,780 A | | 2/1994 | Schuchman et al. | 370/50 |
| 5,393,713 A | * | 2/1995 | Schwob | 455/158.5 |
| 5,408,686 A | | 4/1995 | Mankovitz | 455/66 |
| 5,428,610 A | | 6/1995 | Davis | 370/73 |
| 5,557,541 A | | 9/1996 | Schulhof et al. | 364/514 R |
| 5,638,369 A | | 6/1997 | Ayerst | 370/346 |
| 5,742,893 A | | 4/1998 | Frank | 455/66 |
| 5,819,166 A | * | 10/1998 | Kimura et al. | 455/186.1 |
| 5,825,814 A | | 10/1998 | Detwiler et al. | 375/219 |
| 5,838,384 A | | 11/1998 | Schindler et al. | 348/563 |
| 5,898,910 A | * | 4/1999 | Miyake et al. | 455/186.1 |
| 6,240,280 B1 | * | 5/2001 | Ravi et al. | 455/161.1 |

* cited by examiner

*Primary Examiner*—Thanh Cong Le
*Assistant Examiner*—Lana Le
(74) *Attorney, Agent, or Firm*—Ernest D. Buff & Associates, LLC; Ernest D. Buff; Gordon E. Fish

(57) ABSTRACT

An Enhanced Radio Data System for commercial radio broadcasters comprises a subcarrier modulated for transmitting data impressed on the broadcaster's main carrier frequency. The subcarrier data protocol constitutes an enhancement over existing protocols constructed for this purpose by providing the capability for broadcasters to identify themselves both by their program format as well as by the announcements they carry, and by providing the capability for broadcasters to convey more detailed information in a process with greater inherent intelligence. Such intelligence enables: data typing without separately transmitting the definition of the data types; data compression specific to each type of data; and data formatting and presentation based on the specific characteristics of the data types without the need to separately transmit data formatting and presentation instructions.

13 Claims, 5 Drawing Sheets

Enhanced Radio Data System B-Block Coding

Figure 2

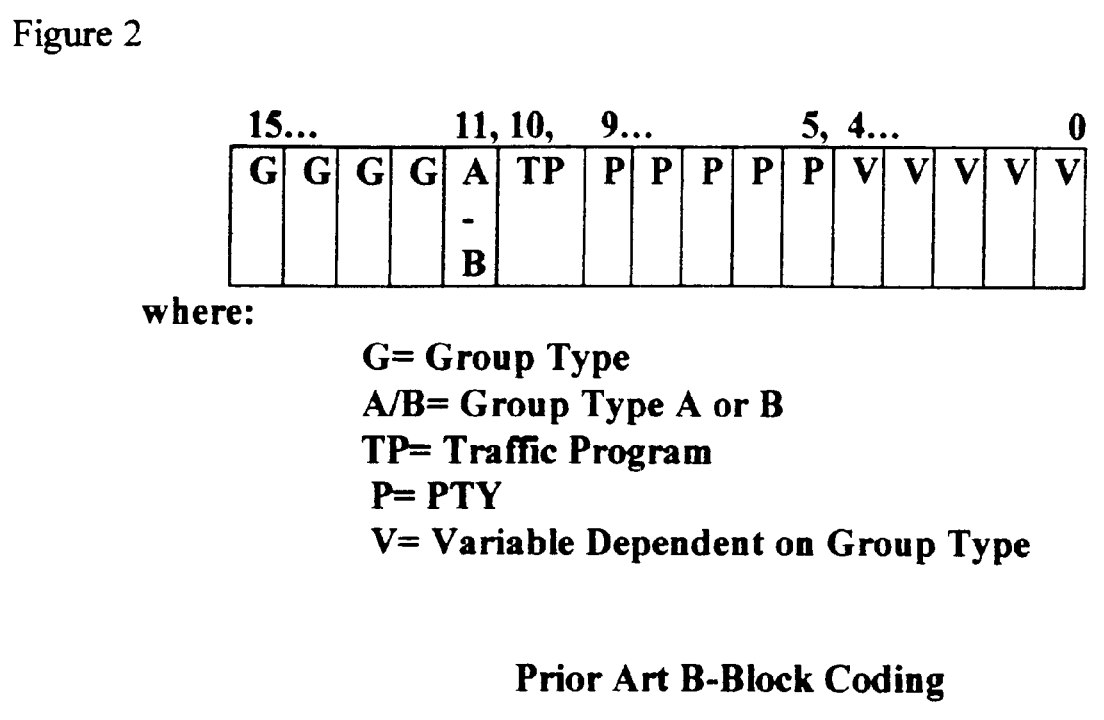

| 15... | | | | 11, | 10, | 9... | | | | 5, | 4... | | | | 0 |
|---|---|---|---|---|---|---|---|---|---|---|---|---|---|---|---|
| G | G | G | G | A-B | TP | P | P | P | P | P | V | V | V | V | V |

where:

G= Group Type
A/B= Group Type A or B
TP= Traffic Program
P= PTY
V= Variable Dependent on Group Type

Prior Art B-Block Coding

Figure 3

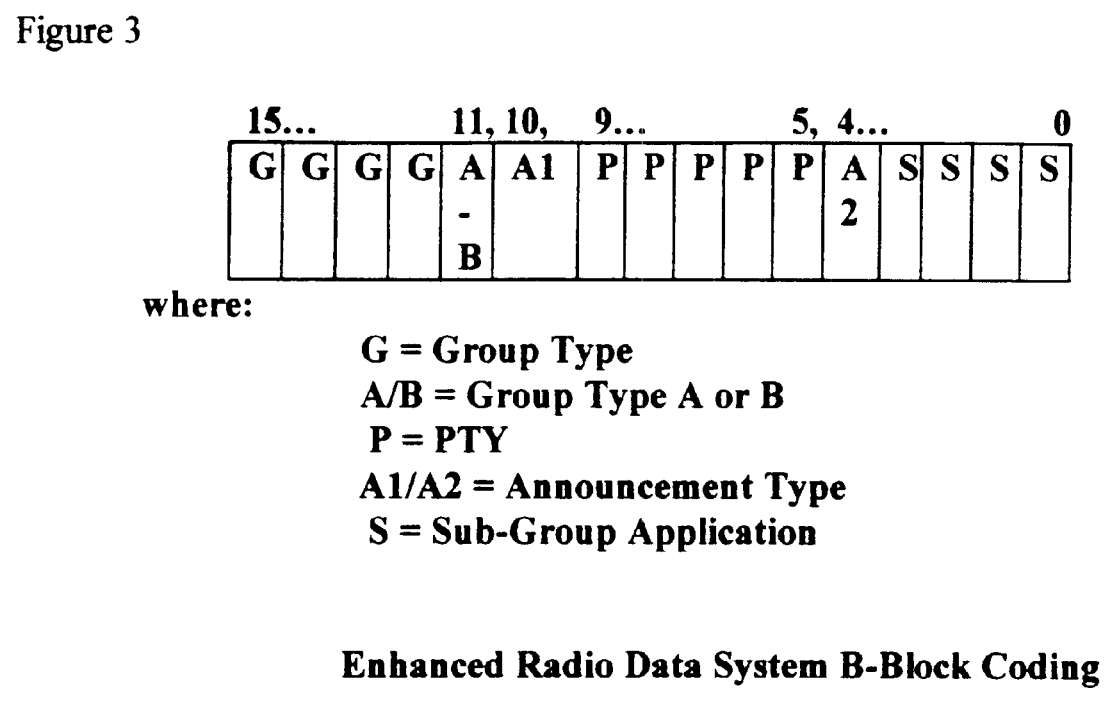

| 15... | | | | 11, | 10, | 9... | | | | 5, | 4... | | | | 0 |
|---|---|---|---|---|---|---|---|---|---|---|---|---|---|---|---|
| G | G | G | G | A-B | A1 | P | P | P | P | P | A2 | S | S | S | S |

where:

G = Group Type
A/B = Group Type A or B
P = PTY
A1/A2 = Announcement Type
S = Sub-Group Application

Enhanced Radio Data System B-Block Coding

Minium Enhanced Radio Data System Screen Definition

FLOW CHART FOR ENCODING TEXT MESSAGES

ENHANCED RADIO DATA SYSTEM

CROSS REFERENCE TO RELATED APPLICATIONS

This application claims the benefit of U.S. Provisional Patent Application No. 60/115,072 filed Jan. 7, 1999, entitled "Enhanced Radio Data System".

BACKGROUND OF THE INVENTION

1. Field of the Invention

The present invention relates to a communication system for transmitting and receiving enhanced text messages with commercial FM radio broadcasts; and more particularly, to a radio communication system wherein the enhanced text messages are displayed on the face of a radio receiver.

2. Description of the Prior Art

The Radio Data Systems (RDS) was developed in Germany in the 1980s as an outgrowth of a traffic alerting system. It is widespread throughout Europe, and was introduced into the US in 1993 where it is known as Radio Broadcast Data System (RBDS). In 1997, numerous automakers introduced RDS radios in the US. RDS uses a low data rate digital subcarrier at 57 kHz to transmit data such as a station's call letters or program type (Jazz, etc.) along with the main radio signal. The data rate is 1187.5 bits per second, equivalent to a 1200 baud modem, although after overhead and mandatory protocol elements are accounted for the remaining data rate available to applications is about 300 bits per second. There is also a provision for sending 32 or 64 character text messages, referred to as "Radio Text". The data is typically displayed on a small monochrome text screen mounted on the radio's face. Most commonly, this screen is 8 characters long, and Radio Text messages are scrolled across the screen to present the entire message.

The RBDS standard is created and published by the National Radio Systems Committee (NRSC), formed jointly by the National Association of Broadcasters (NAB) and the Consumer Electronics Manufacturers Association (CEMA), a division of the Electronics Industry Association (EIA). The RBDS standard is a derivative of the RDS standard published by the European Broadcasting Union, headquartered in Geneva, Switzerland, as CENELEC EN50067.

The RDS data stream consists of 16-bit blocks called A, B, C, and D, which are transmitted sequentially in endless repetition. Each block carries a specific data type, which is defined by the RDS protocol. The A block always carries the radio station ID, B-blocks contain control information, the C block carries either station ID or data, and the D-blocks contain data. Each specific arrangement of A, B, C, and D blocks is called a group, of which there are 32 types, divided into 16 type A groups, and 16 type B groups. The RDS and RBDS standards define specific meanings or applications for several of these groups, while several groups remain unused and undefined. The first four bits of the B block defines to the group number of the possible 16 groups within a group type, and the next bit defines if it is a group type A (bit 5=0) or a group of type B (bit 5=1). Group types are referred to with the notation 0A, 0B through 15A, 15B. The distinguishing character of group type B is that the station ID from the A-Block is duplicated in the C-block of the group, making this slot unavailable for data. In the US, the station ID serves no purpose.

The Group Type determines the application, and thereby the definition of all the variable bits in the B-Block. The Group Types and applications of primary interest to broadcasters in the US include: 0A, Alternate Frequency and Program Service Name (Slogan); 2A & 2B, Radio Text; 10A, Program Type Name (PTYN); and 0B & 15A, Program Service Name (Slogan).

Only one or two applications can be defined by an individual Group Type, that matter being determined by whether the C- and D-Blocks will be used for the same application, or whether the C-Block will carry one application while the D-Block will carry another. As an example, the Group 0A has two applications, one in which the C-Block carries Alternate Frequency information, and one in which the D-block carries Program Service information (also called Slogan).

Two individual bits in the B block are used for highway traffic announcement related indicators (the TP bit, and the TA bit). The TP bit assignment is common to all group types, while the TA bit assignment is only defined in three of the group types. In the prior art, the B block was configured as described in FIG. 2.

One deficiency of the present arrangement is that radio stations can identify themselves as one, but only one, of the 32 categories of Program Types using the PTY bits as listed in TABLE I below. Thus a radio station could define itself as a Rock station, and a listener using an RDS receiver designed to scan for stations by format would be able to find this station. If during a News, Weather, or Sports announcement the station wished to be found by scanning, they could change their PTY to one of News, Weather, or Sports. If the station had selected News, and a listener were scanning at that moment for News, the station would be found. However, once the station changes its PTY from Rock to News, other receivers searching for Rock stations will not discover it until it changes back. Thus, a station can use RDS to identify itself by any one of the available Program Types, specifying a music format (Rock, Classical, Jazz, etc.), or a non-musical program format (News, Weather, or Sports), but only one at a time; and if the station is classified by anything other than what a listener is scanning for, it won't be found.

TABLE I

RBDS LISTING OF PROGRAM TYPES (PTY)

| Number | Binary Value | 8-char Display | Meaning |
|---|---|---|---|
| 0 | 00000 | * * * * | No Program Type |
| 1 | 00001 | NEWS | News |
| 2 | 00010 | INFORM | Information |
| 3 | 00011 | SPORTS | Sports |
| 4 | 00100 | TALK | Talk |
| 5 | 00101 | ROCK | Rock |
| 6 | 00110 | CLS ROCK | Classic Rock |
| 7 | 00111 | ADLT HIT | Adult Hits |
| 8 | 01000 | SOFT ROCK | Soft Rock |
| 9 | 01001 | TOP 40 | Top 40 |
| 10 | 01010 | COUNTRY | Country |
| 11 | 01011 | OLDIES | Oldies |
| 12 | 01100 | SOFT | Soft |
| 13 | 01101 | NOSTALGA | Nostalgia |
| 14 | 01110 | JAZZ | Jazz |
| 15 | 01111 | CLASSICL | Classical |
| 16 | 10000 | R & B | Rhythm & Blues |
| 17 | 10001 | SOFT R&B | Soft Rhythm & Blues |
| 18 | 10010 | LANGUAGE | Language |
| 19 | 10011 | REL MUS | Religious Music |
| 20 | 10100 | REL TALK | Religious Talk |
| 21 | 10101 | PERSNLTY | Personality |
| 22 | 10110 | PUBLIC | Public |
| 23–29 | 10111–11100 | | Unused |

TABLE I-continued

RBDS LISTING OF PROGRAM TYPES (PTY)

| Number | Binary Value | 8-char Display | Meaning |
|---|---|---|---|
| 30 | 11101 | TEST | Emergency Test |
| 31 | 11111 | ALERT! | Emergency |

A similar deficiency relates to the Traffic Program (TP) identifier bit. According to the standards, a radio station may turn on the TP bit to indicate that the station does provide traffic announcements sometime during the day. Obviously, this fact by itself is not very meaningful to listeners interested in hearing a traffic report. The TP bit is associated with a Traffic Announcement (TA) bit (bit 4) for group types 0A, 0B, and 15B. The meanings of TP/TA bit combinations according to the RBDS standard are described in TABLE II.

TABLE II

MEANINGS OF RBDS TP/TA BIT COMBINATIONS

| TP (bit 10) | TA (bit 4) | Applications (in groups 0A, 0B, 15B) |
|---|---|---|
| 0 | 0 | No traffic announcement either on this station or on a network affiliate station |
| 0 | 1 | This station carries information about a network affiliate station that may broadcast traffic announcements |
| 1 | 0 | This station carries traffic announcements, and may carry information about a network affiliate that may carry traffic announcements, but no announcements are currently being broadcast |
| 1 | 1 | A traffic announcement is currently being broadcast on this station |

In groups such as 1A & 1B where bit 4 is not defined as TA, an explanation of how to interpret the TP bit is not provided in the standard. The way the TP/TA scheme is designed, the broadcaster must send a group 0A, 0B, or 15B with both TP and TA set to one to set a flag in a receiver indicating that the station is now transmitting a traffic report, and send a similar message with TP/TA set to 0 to turn off the flag.

In order for a receiver to scan the band to find a station broadcasting a traffic report, the data indicating a traffic report would need to be available in every B-Block being transmitted. Otherwise, if the moment a receiver tuned to a specific station and did not find the desired data, it would have to interpret the absence of that data as an indication that no traffic report is present, and go on to the next station. Otherwise, the receiver would be required to spend an indeterminable amount of time monitoring each and every station in a scan, rendering such a scan useless. Since the combination of TP/TA only appear in three group types (0A, 0B, 15B), and since a radio station for a variety of reasons might send other group types around the time of a traffic report, in the current situation receivers cannot be practically designed to use RDS/RBDS to scan to find radio stations broadcasting traffic reports.

Summarizing this concept with the previously discussed concept, RDS as currently structured does not promote an environment in which receivers can scan to find radio stations in a way that will satisfy the interests of either the listener or the broadcaster.

A third deficiency relates to the capabilities of Radio Text. Radio Text is implemented in application groups 2A and 2B.

The Radio Text feature of Group Type 2A transmits a text stream of 64-characters; the Group Type 2B version of Radio Text transmits a 32-character text stream. The data transmitted by either version is a monolithic chunk, meaning the receiver treats it as a single chunk of 32-characters, or a single chunk of 64-characters. In addition, the protocol allows no identification as to what the data being carried represents. In other words, the data could be a string of asterisks, a message like "Welcome to WQXR New York's Classical Radio Station", a phone number, or any other piece of information. The receiving radio has no way to tell the nature of this data or how to use it. The data can be displayed, and nothing else. Many receivers suppress the display of Radio Text data since in most cases the display screen on the radio is too small and therefore the Radio Text data must be scrolled across it, and since in the present state of the art the information to be transmitted is usually frivolous.

SUMMARY OF THE INVENTION

The present invention provides an enhanced radio data system which represents a significant improvement over RDS. As used herein, the term "Enhanced Radio Data System" is meant to indicate enhancements over both RDS and RBDS. The term "RDS" is used herein in a generic fashion to mean both RDS and RBDS transmission standards and receivers. Where there might be a difference between the U.S. and European standards, the term "RBDS" is used to refer specifically to the U.S. standard.

Among other things, the enhanced radio data system incorporates a protocol enhancement of RDS involving the redefinition of several bits within the B-block as illustrated in FIG. 3. This new protocol, which is backward compatible with RDS receivers, enables the efficient transmission of data such as "Artist & Title," "Coming Next," DJ names, advertisements, phone numbers, etc., coupled with the ability of the receiver to handle this data in an intelligent way.

More specifically, the present invention offers several improvements over RDS, as set out in the following three items.

1. Improvements over Radio Text are afforded by a) providing the ability to transmit and display a large variety of messages within the limited bandwidth made available by the RDS data rate, especially messages relevant to the radio station and its broadcast; b) the specification of an expanded minimum screen size supports larger and more meaningful messages without scrolling, and the standardized positioning of information elements on this screen makes information understandable without additional explanatory information. Particularly, the Enhanced Radio Data System specifies a minimum screen size of two lines by 16 characters each, wherein, for Artist and Title information, "Artist" information would be presented on the top line and "Title" would be presented on the bottom line, and wherein for Coming Next information, the words "Coming Next . . . " would be presented on the top line, and the name of the event that is coming next would be on the bottom line, as illustrated in FIG. 4.

2. The present invention creates a sub-group applications in an encoding scheme that uses the Variable bits in the B-block to supply meanings to the data being transmitted, resulting in a) compression of the data by eliminating the need to transmit data to identify the nature of the data being transmitted—e.g., the application defines the Artist field, so only the name of the artist need be sent instead of a message like "Artist=Elvis Presley"; b) compression of the data by eliminating the need to transmit characters, words and phrases that are implicit in the meaning of the data, and can be displayed by the receiver without having been transmitted (such as "Coming Next . . . "); c) in computer terminology, the encoding scheme has the characteristic of "fielded data", having the advantage that the nature of the data is known to the receiver, which can then offer enhanced capabilities in acting upon a particular data element such as dialing a phone with a received phone number, or by populating the display with "Coming Next . . . " as in the previous example; and d) since the data is fielded and the receiver knows the nature of the data, additional compression can be achieved by utilizing computer-style data compression techniques such as encoding telephone numbers in Binary Coded Decimal (BCD) format.

3. Radio stations can transmit indicators of announcements, such as News, Weather, Sports, or Traffic, independently of the Program Type specified in the B-block, and thus receivers can be designed to scan for stations broadcasting these announcements, while still being able to scan to find radio stations by program format.

Broadly stated, from an end-to-end system perspective the invention provides for an Enhanced Radio Data System comprising the same transmission and receiver elements as today's RDS and RBDS. These transmission and receiver elements comprise: (i) a generating means for generating a carrier wave at a first predetermined frequency and a sub-carrier wave at a second predetermined frequency; (ii) an encoding means for coding the text; (iii) a first modulation means for encoding the subcarrier with the text data generating an encoded subcarrier; (iv) a scheduling means for scheduling the encoding of the subcarrier wave at predetermined intervals; (v) a summing means for adding the audio signal and encoded subcarrier thereby generating a summed signal; (vi) a second modulation means for encoding the carrier wave with the summed signal thereby generating a modulated carrier wave containing both audio signal and text data; (vii) a transmission means for transmitting the modulated carrier wave; (viii) a receiving means for receiving the modulated carrier wave; (ix) a decoding means for decoding the audio signal and the text from the modulated carrier wave; (x) storage means for storing decoded text; (xi) a display means for displaying the text messages; and (xii) an audio signal playing means.

The invention also provides a method for encoding text messages into a commercial radio transmission comprising the steps of: (i) storing into memory a text message; (ii) generating a subcarrier of the carrier frequency of the radio transmission; (iii) segmenting the text message into text segments and blocks of binary data; (iv) assembling the blocks into groups of four blocks each, the groups comprising a data stream for transmission; (v) encoding the groups with Announcement Type bits and Sub-Group Application bits along with the associated data; (vi) modulating the subcarrier with the data stream; and (vii) transmitting the modulated subcarrier as part of the carrier frequency.

Like RDS receivers, the Enhanced Radio Data System receiver comprises an FM receiver, RDS demodulator and decoder, display, microprocessor and memory.

BRIEF DESCRIPTION OF THE DRAWINGS

The invention will be more fully understood and further advantages will become apparent when reference is had to the following detailed description and the accompanying drawings, in which:

FIG. 2 is an illustration of the bit placement and coding of the prior art B-Block of the RDS/RBDS protocol;

FIG. 3 is an illustration of the bit placement and coding of the current invention;

DESCRIPTION OF THE PREFERRED EMBODIMENTS

Figure 1:
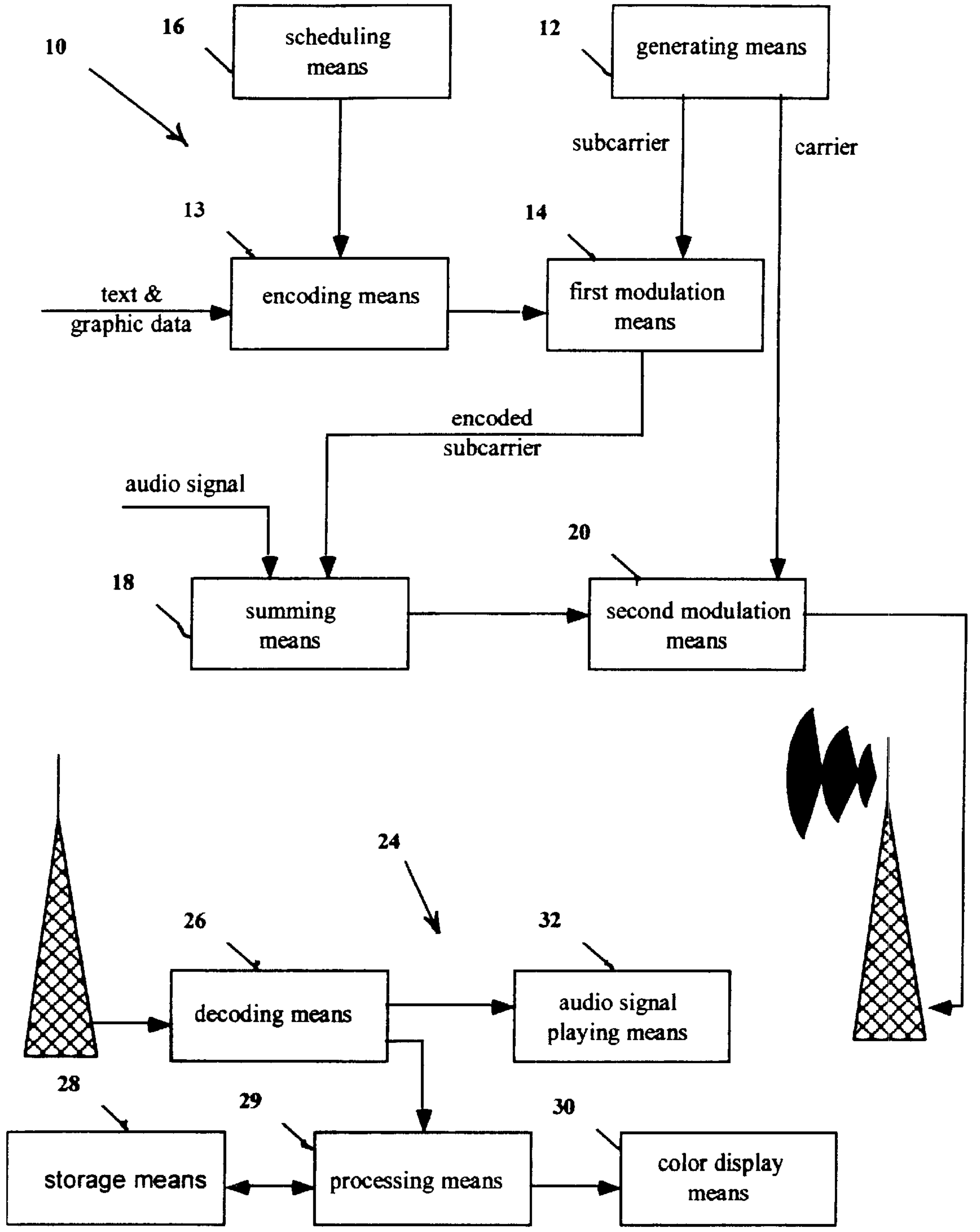
FIG. 1 is a block diagram illustrating the components in an RDS broadcasting and receiving system, and the process of encoding data onto a sub-carrier, and then modulating the encoded data along with audio onto the radio station's main carrier frequency.

Consistent with existing procedures for RDS in which bits 11-15 of the B-Block enumerate Group Types, the Enhanced Radio Data System is defined herein as an RDS application using a pair of the available Group Types such as 11A and 11B, although the more important Sub-Group Applications could be transmitted with just a single Group Type, such as 11A.

The present invention redefines bits in the B block within this application in a specific fashion. The prior art B-Block arrangement is illustrated in FIG. 2, and can be compared to the arrangement of the present invention, shown in FIG. 3. As shown, both arrangements provide the same Group Type definitions using bits 15-11. Also, both arrangements provide the same Program Type definitions using bits 9-5. Conventionally, bit 10 is defined as TP (Traffic Program) for all Group Types, and bits 4-0 are variable, dependent upon Group Type. In three of the defined Group Types, bit 4 is used as TA (Traffic Announcement), to be used in conjunction with TP. In the present invention, bits 10 and 4 are redefined into a pair of bits that can indicate an Announcement Type from the following selection: no announcement, news/weather/sports, traffic, or comedy, as described in TABLE III below. This redefinition is backward compatible with the prior art RDS.

TABLE III

ENHANCED RADIO DATA SYSTEM ANNOUNCEMENT TYPES

| B-block two Bit code* | Comedy | N/W/S** | Traffic |
|---|---|---|---|
| 00 | — | — | — |
| 01 | ✓ | — | — |
| 10 | — | ✓ | — |
| 11 | — | — | ✓ |

*Bits comprising the two bit code are bit 10 and bit 4.
N/W/S = News, Weather, Sports Further, the prior art Variable bits 3-0** are redefined as a Sub-Group Application counter/identifier for associated C-& D-blocks. The redefined Sub-Group Application bits are characterized by the new protocol of the present invention as shown in TABLE IV below. The availability of Sub-Group Applications as defined in this invention enable one pair of Group Types to encompass all the RDS applications of primary interest to U.S. broadcasters, as identified earlier, plus new applications of strong interest to broadcasters and consumers like phone and fax numbers. For purposes of clarity, some Sub-Group Applications are identified with the same terms as used for the counterpart RDS applications. These are: "PS" for "Program Service Name", optionally called "Slogan"; "PTYN" for "Program Type Name", typically implemented as the name of a program—e.g., the radio talk show of Rush Limbaugh might bear the PTYN of "Limbaugh"; and "AF" for "Alternate Frequency", being an indicator of other frequencies carrying the same program

TABLE IV

B-BLOCK SUB-GROUP APPLICATION CODING FOR THE ENHANCED RADIO DATA SYSTEM

| Four bit B-block Application code | C- & D-block in A Group | D-block in B Group |
|---|---|---|
| 0000 | 1st 4 PS Bytes | 16 bit Call Sign |
| 0001 | 2nd 4 PS Bytes | 1st 4 digits BCD Phone |
| 0010 | 1st 4 PTYN Bytes | 2nd 4 digits BCD Phone |
| 0011 | 2nd 4 PTYN Bytes | 3rd 4 digits BCD Phone |
| 0100 | 1st 4 Coming Next Bytes | 1st 4 digits BCD fax |
| 0101 | 2nd 4 Coming Next Bytes | 2nd 4 digits BCD fax |
| 0110 | 3rd 4 Coming Next Bytes | 3rd 4 digits BCD fax |
| 0111 | 4th 4 Coming Next Bytes | 1st 2 City Bytes |
| 1000 | 1st 4 Artist Bytes | 2nd 2 City Bytes |
| 1001 | 2nd 4 Artist Bytes | 3rd 2 City Bytes |
| 1010 | 3rd 4 Artist Bytes | 4th 2 City Bytes |
| 1011 | 4th 4 Artist Bytes | unassigned |
| 1100 | 1st 4 Title Bytes | AF1/AF2 |
| 1000 | 2nd 4 Title Bytes | AF3/AF4 |
| 1000 | 3rd 4 Title Bytes | AF5/AF6 |
| 1000 | 4th 4 Title Bytes | AF7/AF8 |

Notes:
AF = Alternate Frequency, PS = Program Service (Slogan), PTYN = Program Type Name, BCD = Binary Coded Decimal The following TABLE V describes particular data formatting enabled by the unique design of the Sub-Group Applications as incorporating fielded data. A radio station call sign, being either three or four characters beginning with either K or W, would require a field of 32 bits to store the data at the standard encoding form of 8 bits (1 byte) per character in ASCII or similar data formats. However, since the nature of the data is known, more appropriate encodings as shown below have been utilized in the specification to squeeze the call sign into 16 bits (2 bytes). Similarly, telephone and fax numbers can be more appropriately encoded. The North American 10-digit dial plan numbering scheme would require 80 bits (10 bytes) to encode using ASCII. However, the method indicated below in TABLE V can encode a 10-digit phone number with only 16 bits (2 bytes).

TABLE V

ENHANCED RADIO DATA SYSTEM MISCELLANEOUS ENCODING
Call Sign (16 bits in D-block)

| | |
|---|---|
| bit 15: | 1st character 0 = W, 1 = K |
| bits 14–10: | 2nd character* |
| bits 9–5: | 3rd character* |
| bits 4–0: | 4th character* |

*A–Z as codes 1–26 of five bit code 0–31 (0 = null)

Phone & Fax numbers in BCD Format (16 bits in D-block)

| | |
|---|---|
| bits 15–12: | 1st decimal digit |
| bits 11–8: | 2nd decimal digit |
| bits 7–4: | 3rd decimal digit |
| bits 3–0: | 4th decimal digit |

Referring to FIG. 1 of the drawings, there is shown a radio system incorporating the elements of the present invention.

The radio system comprises a transmitting system, shown generally at 10, and a receiving system shown generally at 24, those systems being further comprised of: a generating means 12 for generating a carrier wave at a first predetermined frequency and a subcarrier wave at a second predetermined frequency; an encoding means 13 for encoding text and graphic data; a first modulation means 14 for encoding the subcarrier with the text data generating an encoded subcarrier; a scheduling means 16 for scheduling the encoding of the subcarrier wave at predetermined intervals; a summing means 18 for adding the audio signal and encoded subcarrier thereby generating a summed signal; a second modulation means 20 for encoding the carrier wave with the summed signal thereby generating a modulated carrier wave containing both audio signal and text data; a transmission means for transmitting the modulated carrier wave; a receiving means for receiving the modulated carrier wave; a decoding means 26 for decoding the audio signal and the text from the modulated carrier wave; storage means 28 for storing decoded text; processing means 29 for formatting decoded text and graphic data for visual presentation on a display; a display means 30 for displaying the text messages; and an audio signal playing means 32.

Figure 5:
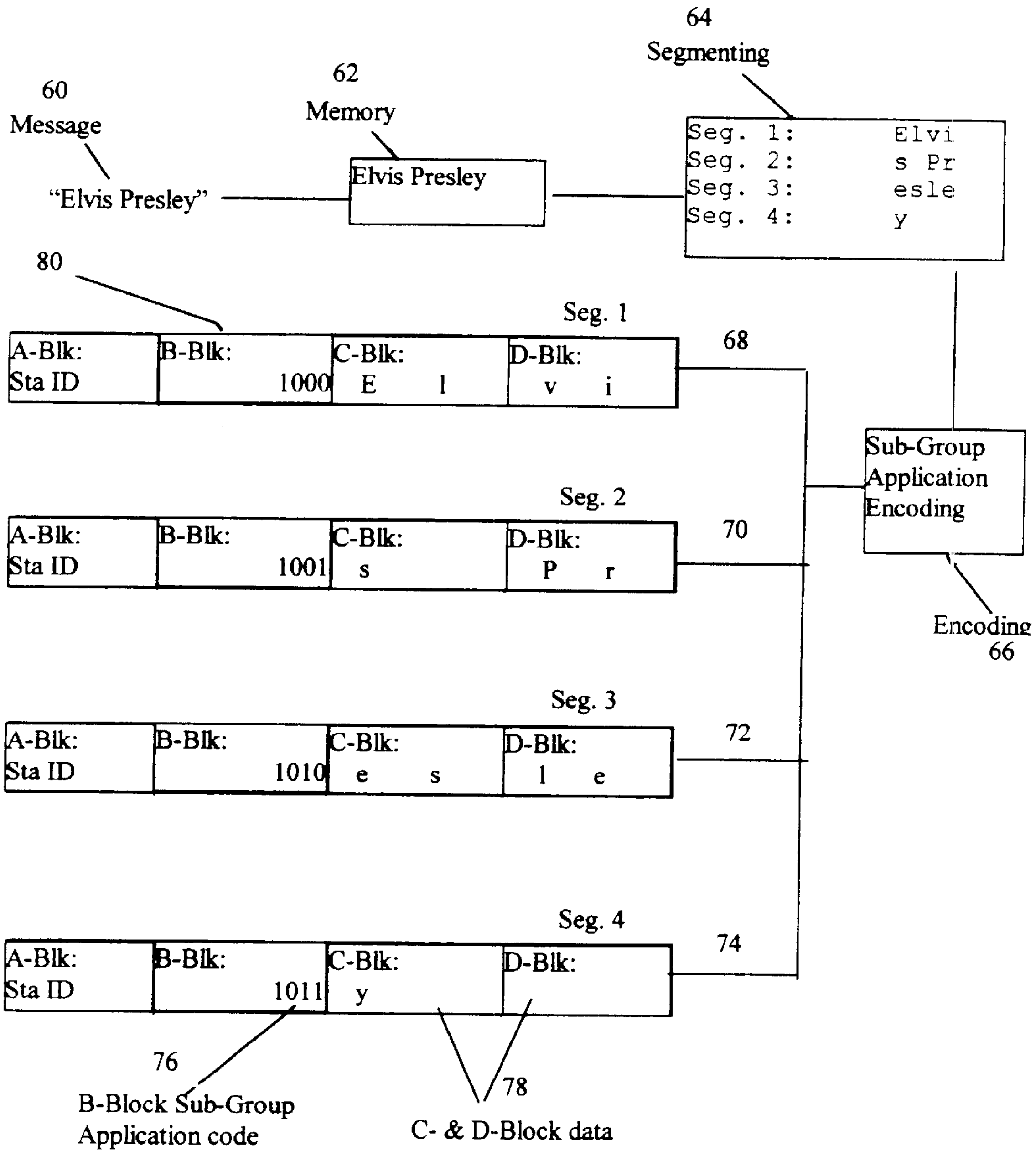

More specifically, the encoding step of FIG. 1 can be seen in detail in the flow chart of FIG. 5. This encoding step provides a method for encoding text messages into a commercial radio transmission comprising the steps of: storing a text message 60 into memory 62; segmenting the text message into text segments and blocks of binary data 64; Sub-Group Application encoding of the data 66 into associated groups for transmission 68, 70, 72, and 74, bearing unique data identifiers in the B-Block 76, and associated data in C-and D-Blocks 78; assembling the segmented data into groups of four blocks each, the groups comprising a data stream for transmission, shown generally at 80.

Figure 4:
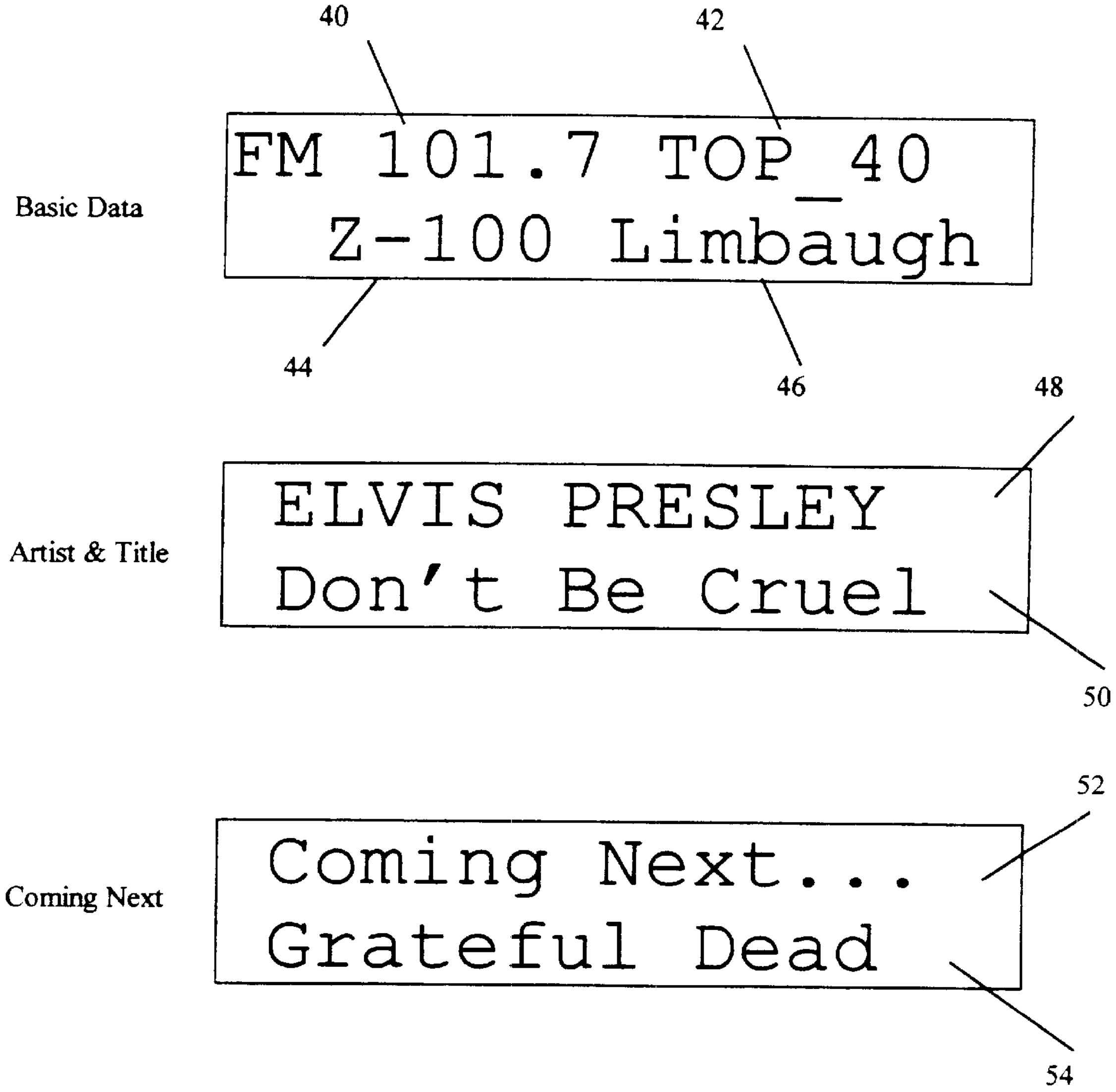
FIG. 4 is an illustration of the minimum screen size and data placements for the most typical Sub-Group Applications enabled by the Enhanced Radio Data System; and, FIG. 5 is a flow chart illustrating the process of encoding a text message using the Sub-Group Application encoding process.

FIG. 4 illustrates the concepts of an increased minimum screen size and the benefits of prescribed locations for specific types of information on a display screen. The minimum screen size defined by this invention is two lines by 16 characters each, totaling 32 characters. The screen indicated as "Basic Data" illustrates a placement basic information such as a listener would be interested in learning rapidly upon tuning to a station. This information includes the frequency 40, the Program Type 42, the radio station's call sign or slogan 44, and the name of the program presently being broadcast 46. The screen indicated as "Artist & Title" illustrates using the top line to present the artist's name, shown at 48, and the bottom line to present the song title, shown at 50. The screen indicated as "Coming Next" illustrates using the top line to present the words "Coming Next . . . ", shown at 52, and the bottom line to present the name of the artist or similar information identifying the desired subsequent event, shown at 54. The phrase "Coming Next . . . " is not transmitted to the receiver, only the data to be presented at 54. The receiver, knowing the nature of the data 54 as a result of its encoding as a Sub-Group Application, knows to present the received data on the bottom line, and the phrase "Coming Next . . . " on the top line.

The present invention defines a new protocol for RDS. All features depend on a new B-block to provide Announcement Type data as well as Sub-Group Application indicators to identify data elements in associated C- and D-blocks.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A method for encoding text messages into a commercial radio transmission, comprising the steps of:

a) storing into memory a text message;

b) generating a subcarrier of the carrier frequency of said radio transmission;

c) segmenting said text message into text segments and blocks of binary data;

d) assembling said blocks into groups of four blocks each, said groups comprising a data stream for transmission;

e) encoding said groups into applications;

f) encoding Program Types into said groups;

g) encoding Announcement Types into said groups to co-exist with Program Types, said Announcement Types to indicate at least one of News, Weather, Sports or Traffic Announcements;

h) modulating said subcarrier with said data stream; and i) transmitting said modulated subcarrier as part of said carrier frequency.

2. A method for encoding text messages into a commercial radio transmission, comprising the steps of:

a) storing into memory a text message;

b) generating a subcarrier of the carrier frequency of said radio transmission;

c) segmenting said text message into text segments and blocks of binary data;

d) assembling said blocks into groups of four blocks each, said groups comprising a data stream for transmission;

e) encoding said groups into applications;

f) encoding Program Types into said groups;

g) encoding said groups into Sub-Group Applications wherein each Sub-Group Application conveys a specific type of data;

h) modulating said subcarrier with said data stream; and i) transmitting said modulated subcarrier as part of said carrier frequency.

3. A method for encoding text messages into a commercial radio transmission as recited in claim 2, wherein said Sub-Group Applications contain fielded data for recognition by a computer system in the receiver.

4. A method for encoding text messages into a commercial radio transmission as recited in claim 2, wherein said Sub-Group Applications imply data to be displayed that is not actually transmitted.

5. A method for encoding text messages into a commercial radio transmission as recited in claim 2, wherein one or more of said Sub-Group Applications imply a specific arrangement of data for presentation on a display screen.

6. A method for encoding text messages into a commercial radio transmission as recited in claim 2, wherein at least one of said Sub-Group Applications implies a specific data encoding technique effecting compression of the data.

7. A method for encoding text messages into a commercial radio transmission, comprising the steps of:

a) storing into memory a text message;

b) generating a subcarrier of the carrier frequency of said radio transmission;

c) segmenting said text message into text segments and blocks of binary data;

d) assembling said blocks into groups of four blocks each, said groups comprising a data stream for transmission;

e) encoding said groups into applications;

f) encoding Program Types into said groups;

g) encoding Announcement Types into said groups to co-exist with Program Types, said Announcement Types indicating at least one of News, Weather, Sports or Traffic Announcements;

h) encoding said groups into Sub-Group Applications wherein each Sub-Group Application conveys a specific type of data;

i) modulating said subcarrier with said data stream; and j) transmitting said modulated subcarrier as part of said carrier frequency.

8. A method for encoding text messages into a commercial radio transmission as recited in claim 7, wherein said Sub-Group Applications contain fielded data for recognition by a computer system in the receiver.

9. A method for encoding text messages into a commercial radio transmission as recited in claim 7, wherein said Sub-Group Applications imply data to be displayed that is not actually transmitted.

10. A method for encoding text messages into a commercial radio transmission as recited in claim 7, wherein at least one of said Sub-Group Applications implies a specific arrangement of data for presentation on a display screen.

11. A method for encoding text messages into a commercial radio transmission as recited in claim 7, wherein at least one of said Sub-Group Applications implies a specific data encoding technique effecting compression of the data.

12. A commercial radio band transmission and receiving system for audio signal and text data comprising:

a) a generating means for generating a carrier wave at a first predetermined frequency and a subcarrier wave at a second predetermined frequency;

b) an encoding means for identifying the program content of the broadcaster both by program format and by Announcement Type;

c) a first modulation means for encoding said subcarrier with said text data generating an encoded subcarrier;

d) a scheduling means for scheduling the encoding of said subcarrier wave at predetermined intervals;

e) a summing means for adding said audio signal and encoded subcarrier thereby generating a summed signal;

f) a second modulation means for encoding said carrier wave with said summed signal thereby generating a modulated carrier wave containing both audio signal and text data;

g) a transmission means for transmitting the modulated carrier wave;

h) a receiving means for receiving said modulated carrier wave;

i) a decoding means for decoding said audio signal and said text from said modulated carrier wave;

j) a storage means for storing decoded text;

k) a display means for displaying said text messages; and l) an audio signal playing means.

13. A commercial radio band transmission and receiving system for audio signal and text data comprising:

a) a generating means for generating a carrier wave at a first predetermined frequency and a subcarrier wave at a second predetermined frequency;

b) an encoding means for text data identifying said data by both a Group Type Application, and a Sub-Group Application;

c) a first modulation means for encoding said subcarrier with said text data generating an encoded subcarrier;

d) a scheduling means for scheduling the encoding of said subcarrier wave at predetermined intervals;

e) a summing means for adding said audio signal and encoded subcarrier, thereby generating a summed signal;

f) a second modulation means for encoding said carrier wave with said summed signal, thereby generating a modulated carrier wave containing both audio signal and text data;

g) a transmission means for transmitting the modulated carrier wave;

h) a receiving means for receiving said modulated carrier wave;

i) a decoding means for decoding said audio signal and said text from said modulated carrier wave;

j) a storage means for storing decoded text;

k) a display means for displaying said text messages; and l) an audio signal playing means.

* * * * *